Jan. 10, 1967 V. MILENKOVIC ET AL 3,298,006

TAPE TRANSCRIBER AND TRANSPORT MECHANISM THEREFOR

Filed Dec. 19, 1962 6 Sheets-Sheet 1

Inventors
Veljko Milenkovic
Carl Zaander
Harry T. Johnson
BY
Olson, Mecklenburger, von Holst,
Pendleton & Neuman Attys

TAPE TRANSCRIBER AND TRANSPORT MECHANISM THEREFOR

Filed Dec. 19, 1962 6 Sheets-Sheet 2

Inventors
Veljko Milenkovic
Carl Zaander
Harry T. Johnson
BY
Olson, Mecklenburger, von Holst, Pendleton & Neuman Attys

TAPE TRANSCRIBER AND TRANSPORT MECHANISM THEREFOR

Inventors
Veljko Milenkovic
Carl Zaander
Harry T. Johnson
BY
Olson, Mecklenburger, von Holst,
Pendleton & Neuman Attys

TAPE TRANSCRIBER AND TRANSPORT MECHANISM THEREFOR

Filed Dec. 19, 1962 6 Sheets-Sheet 4

Inventors
Veljko Milenkovic
Carl Zaander
Harry T. Johnson
BY
Olson, Mecklenburger, von Holst, Pendleton & Neuman Attys

TAPE TRANSCRIBER AND TRANSPORT MECHANISM THEREFOR

Filed Dec. 19, 1962 6 Sheets-Sheet 5

Inventors
Veljko Milenkovic
Carl Zaander
Harry T. Johnson
BY
Olson, Mecklenburger, von Holst,
Pendleton & Neuman Attys Inventors
Veljko Milenkovic
Carl Zaander
Harry T. Johnson
BY
Olson, Mecklenburger, von Holst,
Pendleton & Neuman Attys United States Patent Office 3,298,006
Patented Jan. 10, 1967

3,298,006

TAPE TRANSCRIBER AND TRANSPORT MECHANISM THEREFOR

Veljko Milenkovic, Norridge, Harry T. Johnson, Glenview, and Carl Zaander, Clarendon Hills, Ill., assignors to American Machine & Foundry Company, a corporation of New Jersey Filed Dec. 19, 1962, Ser. No. 245,822
16 Claims. (Cl. 340—174.1)

This invention relates to a tape reading and reproducing transcriber and more particularly to a device and system adapted for transcribing a set of operation-control signals from a plurality of channels of a master magnetic tape to a corresponding number of channels of a copy tape.

The tapes which are associated with the present invention are intended for use in controlling the operation and sequencing of a program-controlled machine such as that disclosed and claimed in co-pending patent application of Johnson et al. Ser. No. 43,090, filed July 15, 1960 now U.S. Patent 3,212,649. A programming system which is particularly adapted for such a program-controlled machine is disclosed and claimed in co-pending application of Johnson et al. Ser. No. 127,971, filed August 3, 1961 now U.S. Patent 3,241,020.

In these two prior patent applications a system is described wherein a program tape is employed which has three separate channels or tracks of program information signals for controlling particular movements of the automatic machine, namely elevation, extension, and traverse of a movable arm associated with that machine. A fourth track on the tape is provided to synchronize the information signals on the first three tape tracks while a fifth track is provided for indicating certain additional functions in addition to the three basic movements described above, such as clamping and unclamping jaws carried by the movable arm, and also for indicating the end of a program sequence. The latter two channels may be combined, if desired.

In the Johnson et al. application Ser. No. 127,971, referred to above, it is specifically disclosed that the automatic machine may be made to continuously and repetitively execute the same control sequences wherein each repetition comprises a complete execution of a given machine job. Continuity of operation is achieved by providing a pair of identical program tapes, one of which is rewound to a starting point, while the other is being read to control the operation of the program-controlled machine. An end-of-program or EP signal is recorded at the conclusion of the program on each of the program control tapes, and, upon sensing this signal, the programming system automatically switches control to the rewound tape which is then started forward and read to control further machine operations. Simultaneously, the tape from which the EP signal had been read is rewound at a greater rate of speed to permit such rewinding to be completed before the sensing of the EP signal from the tape then being read.

This programming system has been found to be very satisfactory for program sequences of relatively long duration. However, for short programs, perhaps of just a few seconds duration, the control of the program-controlled machine is rapidly switched back and forth between the two tapes and the tapes are rewound. This operation causes a relatively small area of the tapes to become worn rapidly, while the remainder of the tapes are unused and the continuous cycling of the tapes is more conducive to wear than constant operation.

It is desirable to utilize program control tapes which, in the case of relatively short programs have a number of such programs consecutively reproduced on the tape, whereby a corresponding number of complete sequences of machine operation will be performed in response to each program tape before the EP signal is encountered. This mode of operation increases the life of the tapes since the wear on the tapes is more evenly distributed.

Also, it is desirable to be able to reproduce program control tapes having programs of relatively long duration, when a number of program-controlled machines are to execute the identical programs simultaneously.

Accordingly, there is a need for transcription apparatus which will not only transcribe a complete program of relatively long duration, but will also transcribe automatically a number of shorter programs from a program control tape to make a copy program tape having a number of identical program sequences taken from one of such sequences on a master tape.

Consequently, it is an important object of the present invention to provide a transcriber which will automatically transcribe a complete program from a master tape to a copy tape.

It is another object of the present invention to provide a transcriber adapted to automatically transcribe a number of relatively short program sequences from the same portion of a master tape and record them on successive portions of a copy tape.

It is a further object of the present invention to provide a transcriber for transcribing programs from a master tape to a copy tape which transcriber is adapted to sense an end-of-program signal on the master tape and record a modified end-of-program singal on the copy tape in the same relative position within the program sequence. The program sequence from the master tape is then recorded again on that portion of the copy tape following the modified end-of-program signal for as many repetitions as the operator desires, recording an unmodified end-of-program signal at the conclusion of the last program sequence recorded on the copy tape. Only the unmodified end-of-program signal causes selection of the alternate program tape by the program-controlled machine.

It is another object of the present invention to provide a transcriber for reproducing a master tape, which transcriber is adapted to transport both master and copy tapes forward to record a program sequence on the copy tape, to rewind the master tape following the sensing of an end-of-program signal from the master tape, the copy tape being halted during the interval in which the master tape is rewound, and thereafter again transporting the master and copy tapes forward for recording an additional program sequence onto the copy tape.

It is a further object of the present invention to cause the master and copy tapes to be halted and rewound after the end-of-program signal is detected on the master tape, the copy tape being only partially rewound and then stopped to cause the copy tape transport to begin forward motion after the complete rewinding of the master tape, and to cause the master tape to begin forward motion after the sensing of the end-of-program signal from the copy tape.

Another object of the present invention is to provide a pair of tape transports each adapted for individually transporting a master or a copy tape, with a common capstan for insuring that the forward speeds of the master and copy tapes are identical during transcribing and associated means for control thereof.

In one embodiment of the present invention, there is provided a tape deck having a pair of tape transport mechanisms each with take-up and supply reels and a transducing head in contact with the tape during forward movement of the tapes. Each of the tracks of the master tape is sensed by its transducing head and the signals detected by the master tape head are recorded in corresponding tracks of the copy tape. When an end-of-program signal is sensed on the master tape, it is modified in a shaper circuit interposed between the master tape head and the copy tape head. When the modified end-of-program signal is recorded on the copy tape it is sensed by a detector circuit connected to the driver amplifier for the copy tape head, delayed through a predetermined time interval and then passed to a control unit to stop both the master and copy tapes. Both tapes, after having been stopped, are reversed and rewound by a signal from the control unit. After a short time, the copy tape is halted after having been only partially rewound, while the master tape continues to be rewound until the beginning of the program sequence is reached. Another sensing device determines when this point has been reached on the master tape, and causes the control unit to stop the master tape and to initiate forward movement of the copy tape. When the modified end-of-program signal is sensed from the copy tape, by an auxiliary copy tape head, this signal is delayed by a predetermined time and then passed to the control unit to restart forward movement of the master tape, to begin the transcription of the next successive program sequence onto the copy tape. This cyclic mode of operation is continued until a switch is thrown by the operator. When the end-of-program signal is sensed by the master tape transducer after the switch has been thrown, it is again employed by the control unit to stop both tapes after a predetermined interval and the actual end-of-program signal is recorded on the copy tape. Following this interval, however, both of the tapes are rewound completely, and the control unit is turned off. Thus a complete transcription of a plurality of sequences is made from the master tape to the copy tape.

For a more complete understanding of the present invention, reference is made to the accompanying drawings in which.

Figures 2, 4:
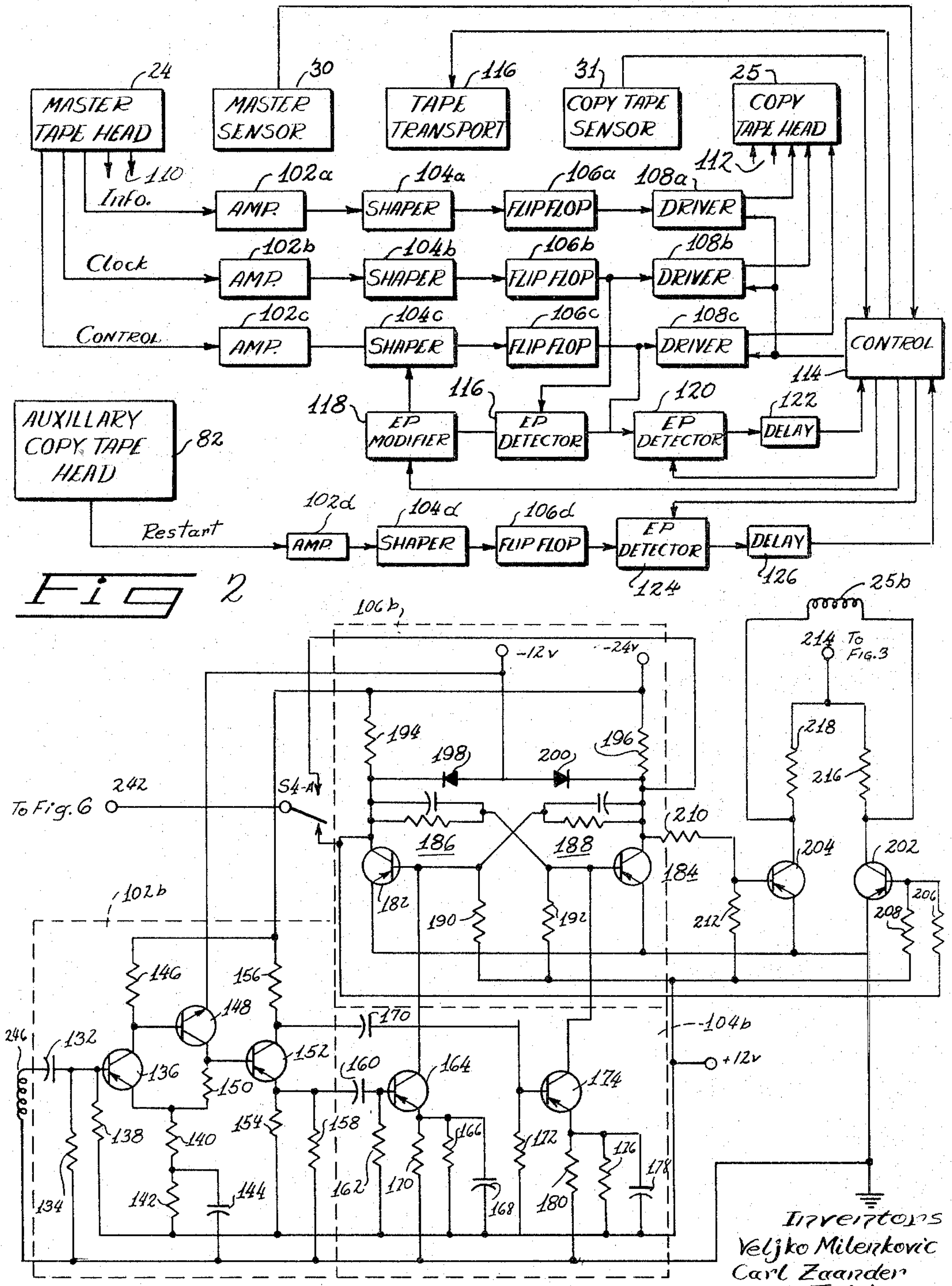
FIG. 2 is a functional block diagram of a multiple channel transcriber embodying the present invention for transcribing information from three tracks of a master tape onto a copy tape.
Figure 3A:
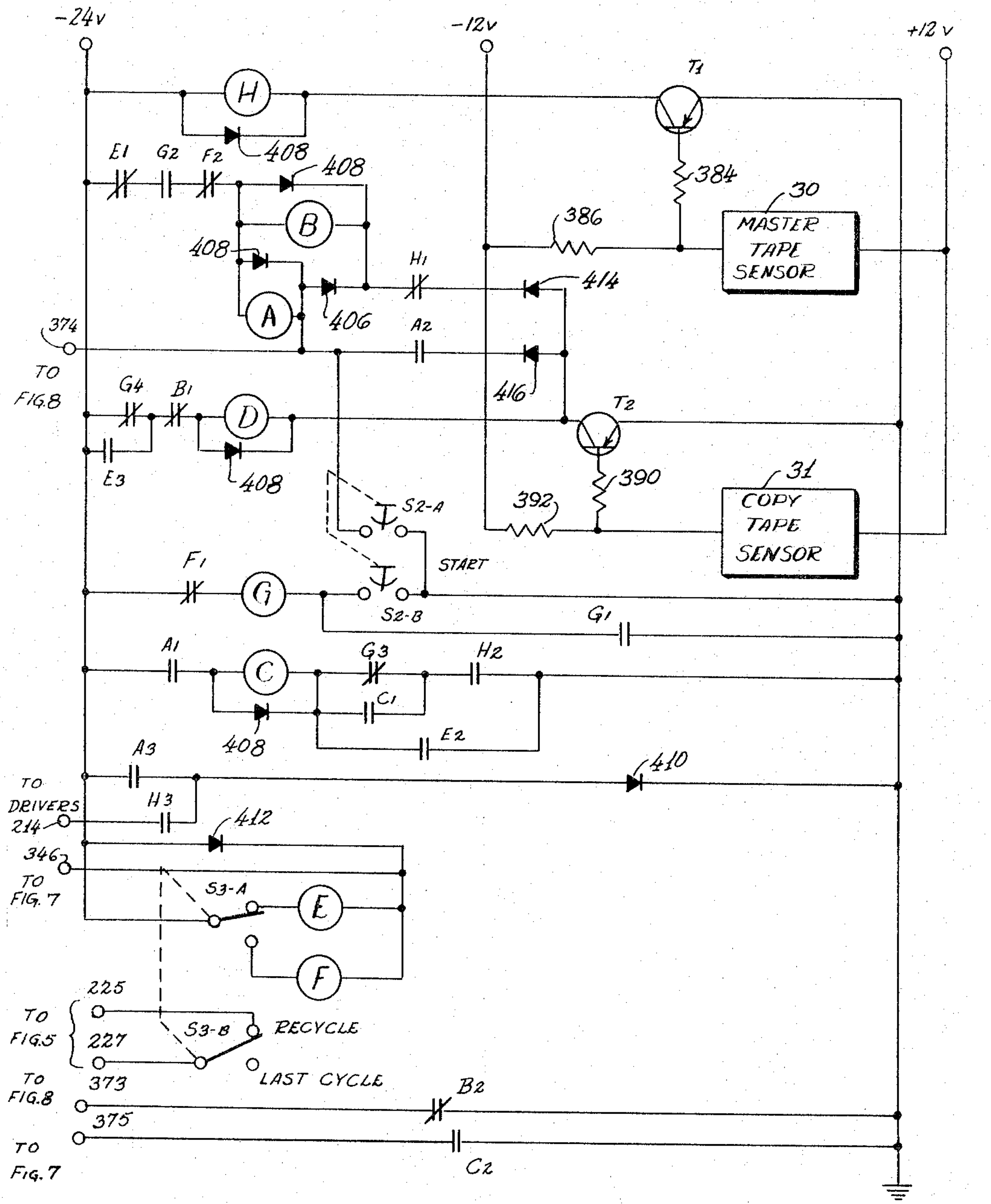
Figure 3B:
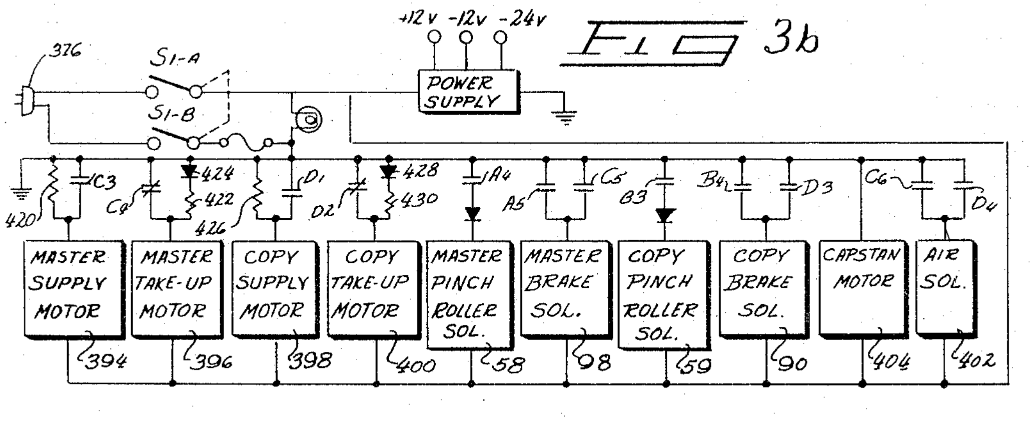
Figure 9:
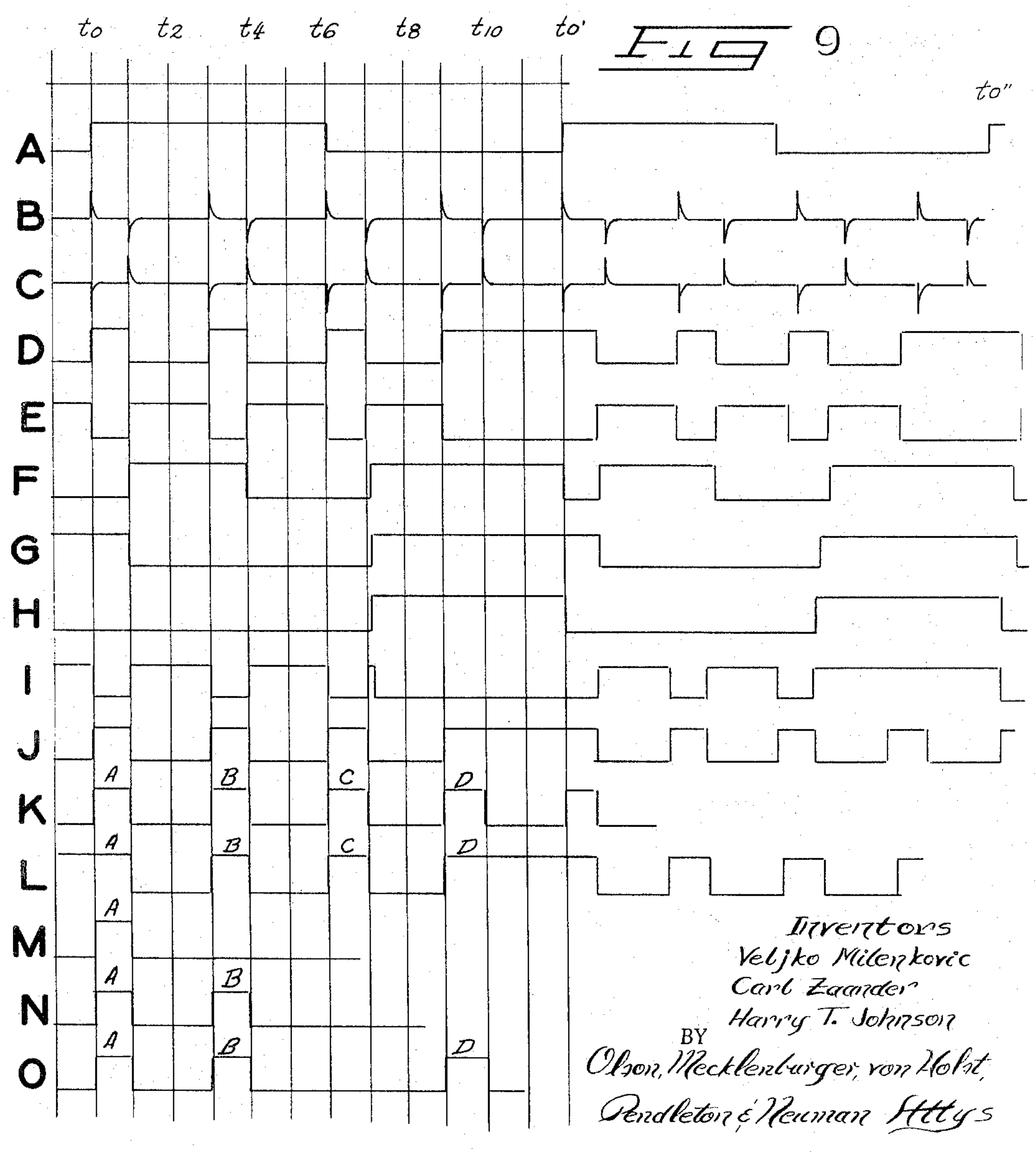
Figure 5:
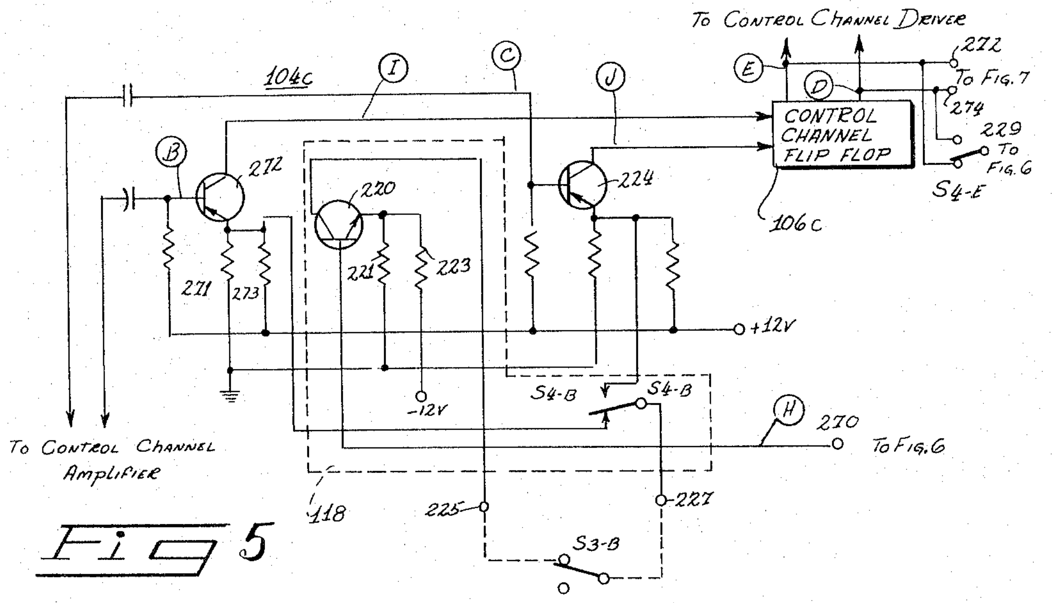
Figure 7:
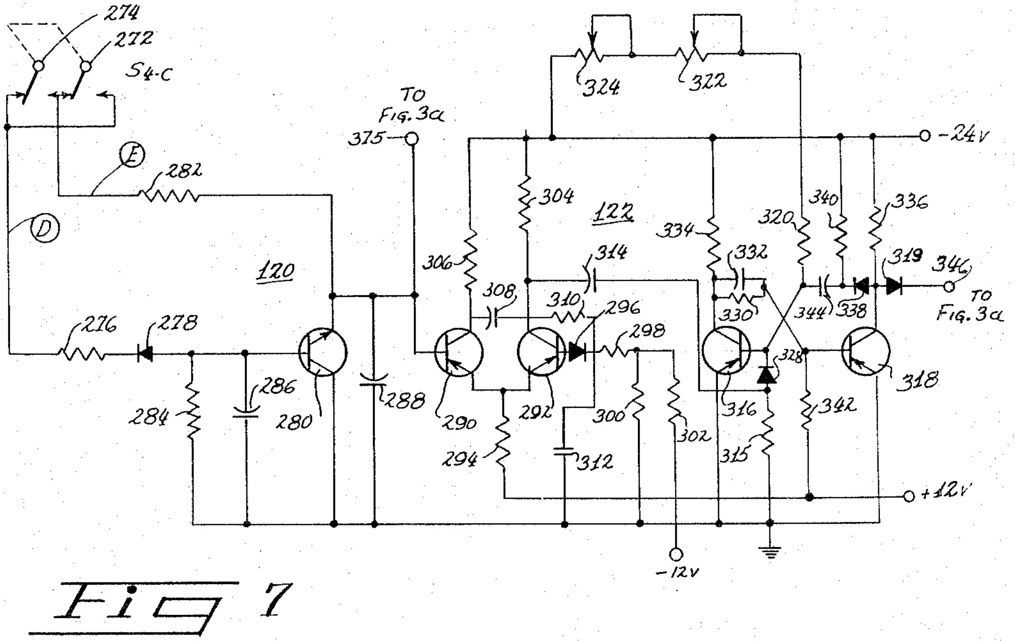
Figure 6:
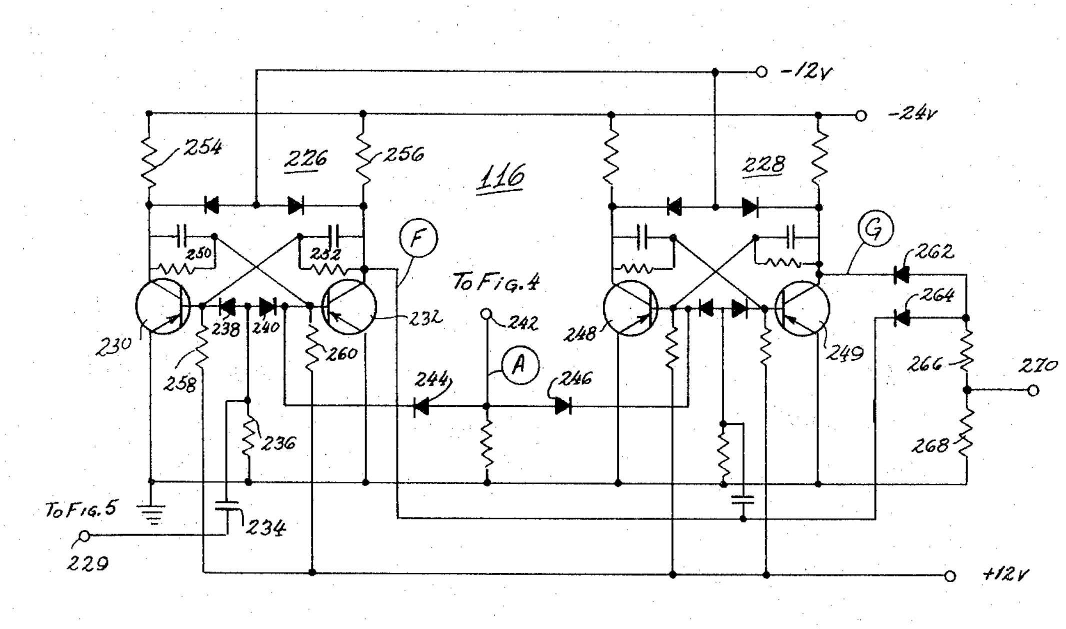
Figure 8:
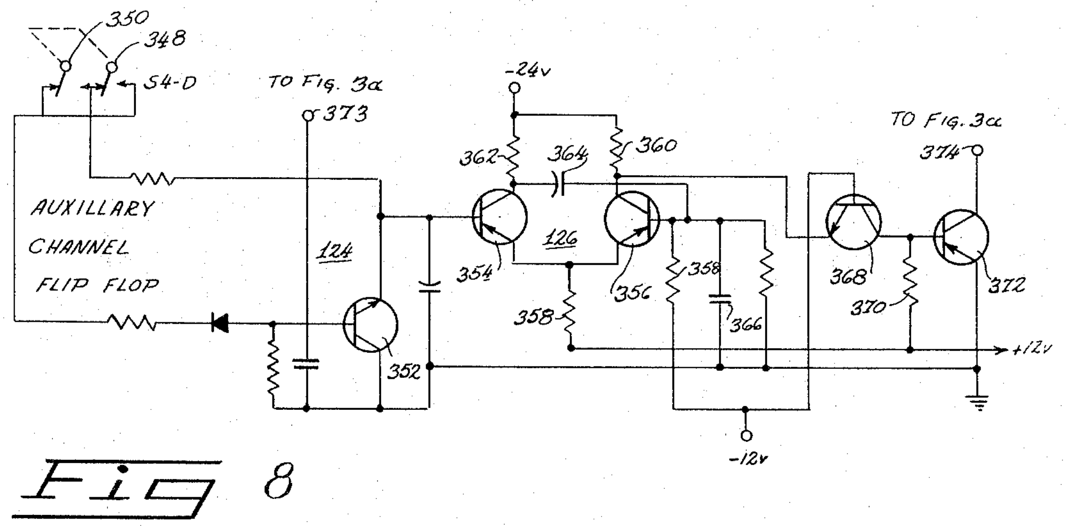

FIGS. 3*a* and 3*b* taken together form a schematic circuit diagram of a control circuit for controlling various functions of the transcriber illustrated in FIG. 2;

FIG. 4 is a schematic circuit diagram of one transcription channel of the transcriber illustrated in FIG. 2 for transcribing the signals on one track of a master tape to a corresponding track of a copy tape;

FIG. 5 is a schematic circuit diagram of a shaping circuit associated with the control signal channel of the transcriber illustrated in FIG. 2 for modifying a signal signifying the end of a program;

FIG. 6 is a schematic circuit diagram of an end of program or EP signal detector associated with the control signal channel of the transcriber illustrated in FIG. 2;

FIG. 7 is a schematic circuit diagram of a detector for detecting a modified end-of-program signal (EP′) associated with the control channel of the transcriber illustrated in FIG. 2;

FIG. 8 is a schematic circuit diagram of a second detector for detecting a modified end-of-program signal (EP′) associated with the restart channel of the transcriber illustrated in FIG. 2; and FIG. 9 comprises a series of curves illustrative of wave forms obtained at various points in the transcriber during its operation.

Figure 1:
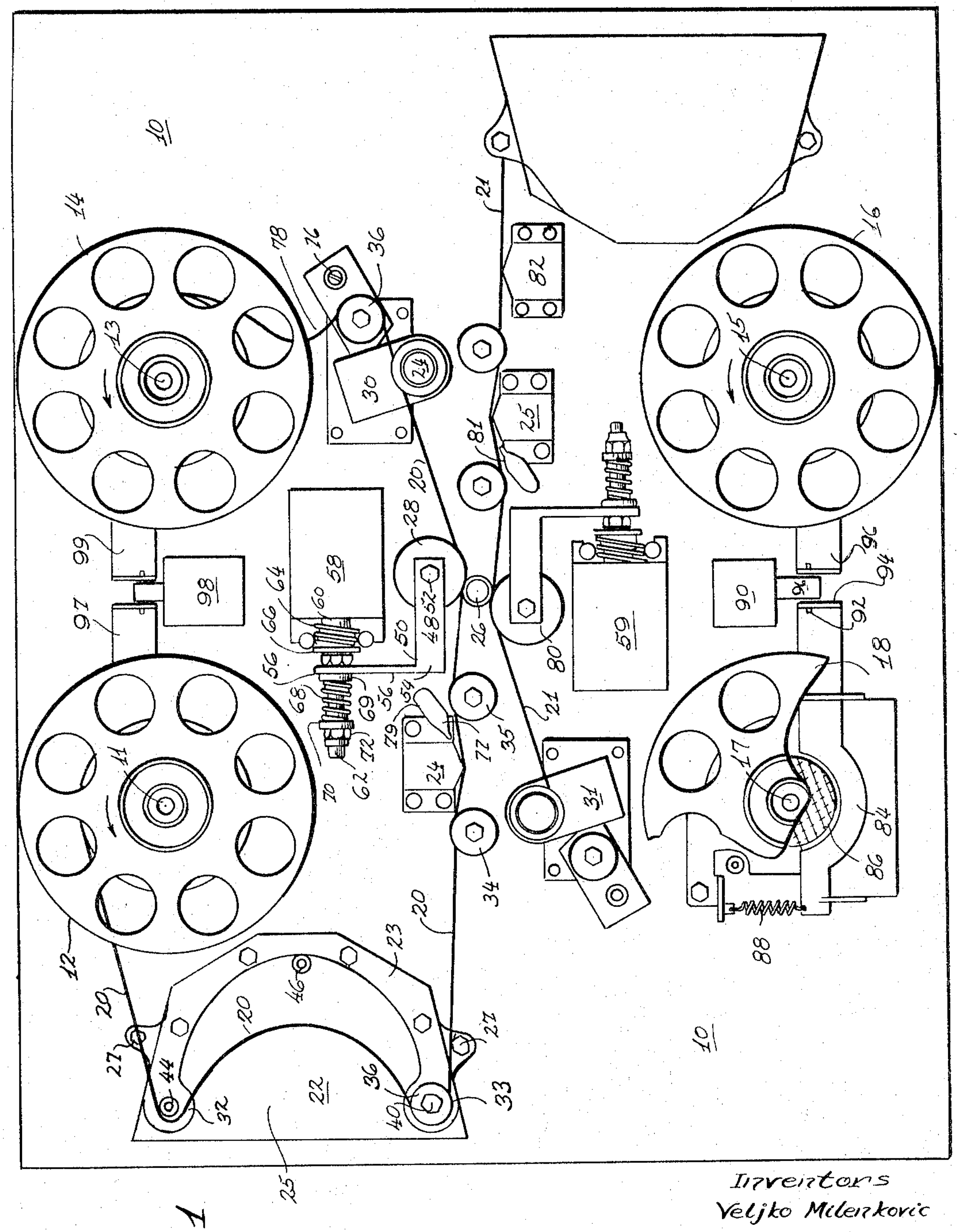
FIG. 1 is a plan view of the tape transport deck of a transcriber embodying the present invention.

Referring now to FIG. 1, where a plan view of the tape transport deck is illustrated, a plate 10 is provided with suitable bearing assemblies for supporting a master tape supply reel 12, a master tape take-up reel 14, a copy tape supply reel 16 and a copy tape take-up reel 18, on shafts 11, 13, 15, and 17, respectively.

The master tape supply reel 12 holds a supply of magnetic tape 20 which has been prerecorded with a program which is to be transcribed onto the magnetic copy tape 21. The tape 20 follows a path leading from the master tape supply reel 12 through a vacuum storage device 22 past a read head 24 through the nip between a continuously rotating capstan 26 and a pinch roller 28. From there, the tape 20 proceeds past a photo cell 30, and then onto the take-up reel 14.

At each of the places along the path of the tape 20 where the tape 20 engages a bearing surface, there is disposed an air bearing 32 through 36. All of the bearings substantially alike and, therefore, only the bearings 32 and 33 will be specifically described. The air bearings 32 and 33 have an outer washer 38 mounted on a hollow tube 44, which is closed by a bolt 40 threadably engaged in the end of the tube 44. The outer washer of the air bearing 32 has been removed, and the tube 44 of the bearing 32 is shown in cross-section. The tube 44 is provided with a number of apertures opening against the tape 20. The tube 44 is secured to a back plate 25 of the vacuum storage 22, passes through the plate 10, and is connected to a source of pressurized air which is preferably at a pressure of 5 to 6 p.s.i., which air is ejected from the apertures to maintain the tape 20 out of contact with the tube 44, but between the back plate 25 and the cover of the vacuum storage 22 and reduce the amount of wear on the tape 20. In the air bearings 34, 35 and 36, the tape is maintained between the inner and outer washers.

The cover of the vacuum storage device 22 is transparent so that the tape 20 may be easily seen. The vacuum storage device 22 has a side wall 23 bolted to a bottom plate 25, and also bolted to the plate 10 through the lugs 27. The interior of the vacuum storage 22 is connected to a tube 46. The tube 46 leads to a vacuum pump which maintains the interior of the vacuum storage 22 at a pressure of about 5 to 7 inches of mercury. The tape 20 is thus bowed inwardly as illustrated when there is any available slack in the tape 20 coming off of the master tape supply reel 12.

The forward speed of the tape 20 past the read head 24 is governed entirely by the angular velocity of the continuously rotating capstan 26 which is operable to drive the tape 20 in the forward direction when the pinch roller 28 is in position to pinch the tape 20 against the capstan 26.

The pinch roller 28 is rotatably mounted on a shaft secured to an arm 48 of a bell crank 50 by a bolt 52. The bell crank 50 is pivotable at a shaft 54 fixed to the plate 10, and has a second arm 56 which is controlled in its position by a solenoid 58. The solenoid 58 has a plunger 60 which is secured to a rod 62. A spring 64 acts against a collar 66 secured to the plunger 60, to urge the plunger 60 into its extended position. The arm 56 of the bell crank 50 is loosely engaged with the rod 62, via an outsize aperture in the arm 56, through which the rod 62 passes, and is urged clockwise by a spring 68 compressed between a slidable collar 69 adjacent the arm 56 of the bell crank 50, and a washer 70, the position of which is fixed with respect to shaft 62 by a nut 72, threadably secured to the rod 62. Thus, when the plunger 60 of the solenoid 58 is withdrawn, as illustrated in FIG. 1, the spring 68 moves the collar 69 to the right, and the bell crank 50 clockwise about its shaft 54 to cause the pinch roller 28 to pinch the tape 20 against the capstan 26, thereby imparting a forward direction of motion to the tape 20. When the tape 20 is being rewound, however, the solenoid 58 is de-energized, whereby the spring 64 moves the plunger 60 to its extended position, and in turn moves a nut 71, which is threadably secured to the rod 62, against the bell crank arm 56, turning the bell crank 50 counter-clockwise to disengage the pinch roller 28 from the capstan 26.

The photo cell 30 cooperates with a light source 74 to sense the transparent leader portion of the master tape, which controls certain operations of the transcriber in a manner which will be more fully described hereinafter.

The source of pressurized air which is connected with the air bearings 32 through 36 is also connected with a tube 76 which is provided with one aperture to blow a jet of air against the tape 20. This jet causes a small loop 78 to be formed near the take-up reel 14, to take up any slack which may be present between the capstan 26 and the take-up reel 14.

A nozzle 77, which is provided for the purpose of directing a jet of air between the master tape 20 and the master tape read-write head 24, during the rewinding operation of the tape, is mounted on a tube 79 extending through and fixed to the plate 10. The purpose of this nozzle is to keep the master tape out of sliding contact with the read-write head 24 during rewinding, in order to reduce wear of both the tape 20 and the read-write head 24. The tube 77 is connected to an air valve (not shown) operated by an solenoid (not shown). A similar nozzle 81 is provided for the copy tape 29 and is also connected to the air valve. The air solenoid is controlled to permit air to flow through the nozzles 77 and 81 only during rewinding of the tape. The mechanism for controlling the air solenoid will be more fully described hereinafter.

The apparatus associated with the copy tape 21 is similar to that which has been specifically described with respect to the master tape, except that the copy tape head 25 need only be suitable for writing or recording onto the copy tape. It should be noted, however, that the capstan 26 drives both the master tape 20 and the copy tape 21 simultaneously by virtue of the master tape pinch roller 28 and a similar copy tape pinch roller 80, both of which pinch their respective tapes against the capstan 26 to move their respective tapes in a forward direction. Thus both tapes move forward at the identical speed, and any wow or flutter which may be present in the transport system does not affect the accuracy of transcription onto the copy tape.

In addition to the mechanism described in connection with the master tape, the copy tape apparatus is provided with an auxiliary read head 82, which is adapted to read only a single track from the copy tape 21, namely, the control signal track. The master tape read head 24 and the copy tape write head 25 are each adapted to read or record, simultaneously, a number of parallel tracks on the master and copy tapes.

Each of the four tape reels of the transcriber is provided with a braking mechanism. The copy tape take-up reel 18 is partly broken away to illustrate the brake. A yoke 84 is provided, the inside surface of which is in engagement with a brake drum 86 fixed to the shaft 17, upon which the copy tape take-up reel 18 is mounted. The yoke 84 is urged into braking engagement with the drum 86 by a spring 88, secured to a member 89 which is bolted to the plate 10. The yoke 84 is normally maintained away from such engagement with the drum 86 by a solenoid 90 which is connected to the yoke 84 by a pin 92 connected to the plunger 96 of the solenoid and extending through an aperture in an upturned flange 94 of the yoke 84. A similar yoke 96 with a spring (not shown) is provided for the copy tape supply reel 16. The yokes 84 and 96 are operated together to brake both of the copy tape reels 16 and 18 simultaneously, and to release both simultaneously. A like solenoid 98 is provided for selectively braking the two master tape reels 12 and 14, via yokes 97 and 99. The brake solenoids 90 and 98 are de-energized to stop the rotation of their respective reels before reversing their direction of rotation to rewind the tapes 20 and 21.

Each of the four reels 12, 14, 16 and 18 is provided with a separate motor (not shown), each of the take-up motors being energized so as to rotate in the forward direction (indicated by the arrows on each of the reels 12, 14, 16 and 18), and each of the supply motors being oppositely energized to maintain the proper tension on the tapes 20 and 21. When the tapes are moving in the forward direction, the speed is regulated by the capstan 26, the take-up motor merely serving to wind up the tape which has been read, and the supply motor serving to maintain proper tension on the tapes. More power is consequently furnished to the take-up motor than the supply motor. But when the direction of the tapes 20 and 21 is reversed, as during rewinding of the tapes upon the supply reels, the current supplied to the take-up motors is reduced, and that supplied to the supply motors is increased. This will be more fully described hereinafter with reference to FIG. 3*b*.

Referring now to FIG. 2, which is a functional block diagram of a transcriber embodying the present invention, there is shown the master tape head 24, and the copy tape head 25 interconnected with three transcription channels, respectively indicated as information, clock, and control channels. The units of each channel are identified by the letter *a*, *b*, or *c* following the reference numeral. Each of the three channels is connected from the master tape head 24 through an amplifier 102 which amplifies the signals detected by the tape head 24, and then to a shaper 104 which shapes the signals amplified by the amplifier 102. From the shaper 104, the signals are applied to a flip-flop 106 which manifests a rectangular wave shape, and which drives a channel of the copy tape head 25 through a driver amplifier 108.

Although only the three above-named channels have been illustrated in FIG. 2, it will be apparent that other information channels could easily be provided for association with additional tracks on the master and copy tapes. The additional unconnected leads 110 on the master tape head 24 and 112 on the copy tape head 25 are illustrated for this purpose, which leads can be interconnected in the same manner as the single information channel illustrated in FIG. 2.

A control unit 114 controls the operation of the driver amplifiers 108 and the various functions of the mechanical tape transport 116, to permit the master and copy tapes to be transported in a forward direction, transcribing the program which is recorded on the master tape, and then to permit the master tape to rewind preparatory to another forward operation of both the master and control tapes for an additional transcription of the program recorded on the master tape. The control unit 114 disables the driver amplifiers 108 during rewinding of the tapes, in order not to record spurious signals on the copy tape.

At the end of a program, an end-of-program or EP signal is recorded on the master tape in the control track of the tape. The EP signal is detected by an EP detector 116, responsive to the outputs of the flip-flops **106*c* associated with the control track, and 106*b*, associated with the clock track. The EP detector 116 controls an EP modifier 118 which is connected to the shaper 104*c*** of the control channel to modify the signal being transcribed onto the control track of the copy tape. This modified signal will be referred to as a modified EP signal or an EP′ signal. The presence of the EP′ signal on the copy tape indicates that the program, which has been recorded on the copy tape just previously to the occurrence of the EP′ signal, is to be recorded again.

When a program-controlled machine is being controlled in its operations by a pair of tapes, one or both of which is identical to the copy tape, the EP′ signal does not cause the control mechanism of the program controlled machine to switch from one tape to the other, but to continue reading from the same tape. The control function switches from one tape to another only when an unmodified EP pulse is detected.

As noted above, the EP′ signal is passed through the shaper **104*c*, the flip-flop 106*c* and is recorded on the copy tape by the driver amplifier 108*c***. The modified EP signal is detected by an EP′ detector 120, the output of which is delayed by a delay unit 122 and then passed to the control unit 114 to cause the forward motion of both the master and copy tapes to be stopped, and then reversed. The reversal of the copy tape lasts only for a short period of time, whereupon the copy tape is stopped. The master tape, however, is completely rewound until the master tape photo cell or sensor 30 indicates the presence of the transparent leader between the photo cell 30 and the lamp 74 (FIG. 1). The master tape sensor 30 then furnishes a signal to the control unit 114 which causes the master tape to be stopped, and the copy tape to be started in its forward direction.

When the EP′ signal, which has been recorded on the copy tape, reaches the auxiliary copy tape head 82, while the copy tape is again moving forward as described above, a restart channel, the components of which are identified by the letter *d* following the reference numerals, becomes effective. The restart channel includes the auxiliary copy tape head 82, an amplifier 102*d*, a shaper 104*d*, and a flip-flop 106*d*. The output of the flip-flop 106*d* is sensed by an EP′ detector 124, which is responsive to the EP′ signal to produce an output. The output of the EP′ detector 124 is delayed for a predetermined time by a delay device 126 and then transmitted to the control unit 114 to restart forward progress of the master tape. After the delay introduced by the delay device 126, another transcription of the program recorded on the master tape is then begun in the same manner as before. When a sufficient number of programs have been successively recorded on the copy tape, a switch associated with control unit 114 disables the EP modifier 118. Upon the occurrence of the EP signal, at the output of the flip-flop 106*c*, which EP signal is detected by the EP′ detector 120, the control unit 114 causes both the master and copy tapes to be stopped, reversed, and rewound completely until the master and copy tape sensors 30 and 31 indicate complete rewinding of their respective tapes, whereupon, each of the master and copy tapes are individually stopped, and the operation of the transcriber is complete.

The control unit 114 also operates to disable the EP′ detectors 120 and 124 during the rewinding portions of the cycle when these detectors might be erroneously operated.

Referring now to FIG. 4, there is shown a schematic circuit diagram of one of the transcription channels of the transcriber, namely, that associated with the clock signal track of the master tape. The amplifier 102*c* is contained within the dashed rectangle having a corresponding reference number 102*b*, and the shaper circuit 104*c* is also illustrated within the dashed rectangle having the same reference number 104*b*. The input of the amplifier 102*b* is connected to the section 24*b* of the master tape transducing head 24 which is associated with the clock channel track on the master tape. The input is passed through a blocking capacitor 132 to the base of a transistor 136 which is connected to ground through a resistor 134. The base of the transistor 136 is also connected to a potential of +12 volts through a resistor 138. The emitter of the transistor 136 is connected to +12 volts through series connected resistors 140 and 142, and a capacitor 144 is connected from the junction of resistors 140 and 142 to ground. The collector of the transistor 136 is connected through a resistor 146 to a potential of −24 volts. The transistor 136 is biased for operation as a class A amplifier, the emitter-base curent flowing from +12 volts through the resistors 142 and 140 to the emitter of the transistor 136 and its base through the as a class A amplifier, the emitter-base current flowing through resistor 146 to a potential of −24 volts. The output at the collector of the transistor 136 is connected to the base of a transistor 148 connected in common collector arrangement. The collector of the transistor 148 is connected through a resistor 150 to the emitter of the transistor 136 and its emitter is connected directly to −12 volts. The transistors 136 and 148 together form a preamplifier, the output of which is connected to the base of a phase splitter transistor 152. The emitter of the transistor 152 is connected through a resistor 154 to +12 volts, and through a resistor 158 to ground. The collector of the transistor 152 is connected through a resistor 156 to −24 volts. The values of the resistors 154, 156 and 158 are chosen such that two outputs at the emitter of the transistor 136 and from its base through the have the same A.C. amplitude, but inverse phase. Each of these two outputs is passed to a separate shaper circuit, both of which are included within the dashed rectangle 104*b*.

The emitter of the transistor 152 is connected to a differentiating circuit including a capacitor 160 and a resistor 162, the junction of which is connected to the base of a transistor 164, which is biased by a circuit including the resistor 166 and the capacitor 168 connected to +12 volts and the resistor 170 connected to ground.

The collector of the transistor 152 is connected to a similar differentiating circuit including the capacitor 170 and the resistor 172, the junction of which is connected to the base of a transistor 174. The emitter of the transistor 174 is biased by a circuit including the resistor 176 and the capacitor 178 connected to +12 volts and the resistor 180 connected to ground. Each of the shaper transistors 164 and 174 is normally biased off, but becomes conductive when a negative-going pulse is presented to its base by its respective differentiator. It should be noted that the signals detected from the master tape are pulses having sharp wave fronts at their leading and trailing edges, which become sharp positive and negative pulses on differentiation. The negative pulses are alternately presented to the base of the shaper transistors 164 and 174 at the leading and trailing edges of the pulses detected by the master tape head 24 and amplified by the circuit 102*b*. The collectors of the shaper transistors 164 and 174 are connected to the bases of the transistors 182 and 184 of the flip-flop 106*c*, which is illustrated within the dashed rectangle 106*c*. The bases and collectors of the transistors 182 and 184 are cross coupled by the feedback circuits 186 and 188, and the bases of the transistors 182 and 184 are biased through the resistors 190 and 192 connected to +12 volts.

The collectors of each of the transistors 182 and 184 are connected to −24 volts through the resistors 194 and 196, respectively. The diodes 198 and 200 are connected between the respective collectors of the transistors 182 and 184 to clamp the relatively negative portions of the wave form at the collectors of the transistors 182 and 184 to −12 volts. The emitters of both the transistors 182 and 184 are connected to ground so that the relatively positive portion of the wave form at the collectors of the transistors 184 and 186 is close to ground potential.

It will be understood by those skilled in the art that the flip-flop 106*b* is a bistable multivibrator, having two stable states, in each of which states one of the transistors 184 and 186 is conductive, but not the other. A positive pulse received from either of the shaper transistors 164 and 174 by such shaper transistor being driven into conduction, cuts off its associated flip-flop transistor 182 or 184, and renders the other flip-flop transistor conductive.

The collectors of the transistors 182 and 184 are connected to the terminals of a switch S4–A, which is arranged so that either one of the collectors is selectively connected to a terminal 242. A timing signal is derived from this terminal which is used by the EP detector 116 in a manner which will be described hereinafter.

The outputs from the flip-flop 106*b* are taken from the collectors of the transistors 182 and 184, and are connected to the bases of transistors 202 and 204 respectively by voltage divider circuits having the resistors 206 and 208, and 210 and 212 respectively. The transistors 202 and 204 make up the driver amplifier for the copy tape head section 25*b*, which is associated with the clock track of the copy tape. The collectors of transistors 202 and 204 are also connected to a terminal 214 through resistors 216 and 218 respectively. The terminal 214 is connected to a portion of the control circuit illustrated in FIG. 3 which will be more fully described hereinafter. At this point it may be briefly stated that the terminal 214 is clamped to ground potential during rewinding of the master tape so that the copy tape does not record signals which may be derived during rewind, and is connected to −24 volts during the transcription portion of the operation, so that the transistors 202 and 204 are controlled from the flip-flop 106*b* to produce current flow through the copy tape head 25*b* and transcribe the signals onto the clock track of the copy tape.

Although FIG. 4 illustrates particularly the circuitry associated with the clock channel (*b*) of the transcriber, it will be appreciated that the information channel (*a*) and the control channel (*c*) may be identical with respect to the circuitry within each of the functional blocks illustrated in FIG. 2, except for the control channel shaper 104*c*, which will be described hereinafter. Moreover, the amplifier 102*d*, shaper 104*d* and flip-flop 106*d* of the restart channel (*d*) may also be identical to corresponding components of the clock channel illustrated in FIG. 4.

Referring now to FIG. 5, the shaper circuit 106*c* of the control channel is illustrated, which shaper circuit is identical with that illustrated in FIG. 4, except that it is provided with a trigger circuit including the transistor 220, which circuit is not included in the shaper circuits associated with the other channels. The two shaper transistors 222 and 224, and their associated circuitry, however, taken alone are identical to the shaper circuit 104*b* illustrated in FIG. 4. The inputs connected to the bases of the shaper transistors 222 and 224 are connected from an amplifier 102*c* (FIG. 2) which is identical to the amplifier circuit 102*b* illustrated in FIG. 4, and the output of the shaper 104*c* is connected to its flip-flop 106*c* (FIG. 5), which in turn is connected to a driver amplifier 108*c* (FIG. 2), in the identical manner as illustrated in FIG. 4.

The trigger transistor 220 has its base connected to terminal 270, and is normally biased off by a resistor 221 connected from its emitter to ground and resistor 223 connected from its emitter to −12 volts. Its collector is connected to a terminal 225 which is normally connected to a terminal 227 by the normally closed switch 53–B (FIG. 3*a*). The terminal 227 is connected to the emitter of the transistor 222 through a switch S4–B normally in the condition illustrated in FIG. 5.

The dashed outline 118 in FIG. 5, enclosing the trigger transistor 220 and its components comprises the EP modifier 118 which performs the function of modifying the EP signal to the EP′ signal, and is responsive to the EP detector 116 of FIG. 6. When no EP signal is detected, the driver 108*c* is operative to transcribe signals derived from the control track of the master tape exactly as they are detected and shaped. When an EP signal is detected, however, the trigger transistor 220 is responsive to the EP detector 116.

It will be recalled that the function of the EP detector 116 and the EP modifier 118 is to detect the presence of an EP signal at the output of the flip-flop 106*c* of the control channel, and to modify that EP signal into an EP′ signal so that the selection of the alternate program tape is not made prematurely when the copy tape is being used to control a program-controlled machine through multiple cycles.

The EP detector 116 is illustrated in FIG. 6 and includes a pair of flip-flops 226 and 228 including the transistors 230 and 232, and the transistors 248 and 249, respectively. The input terminal 229 of the EP detector 116 is connected to the correspondingly numbered output terminal of the control channel flip-flop 106*c* (FIG. 5) which in turn is connected to one of the flip-flop outputs through a switch S4–E. The input terminal 229 is connected to the bases of the two transistors 230 and 232 of the flip-flop 226 by way of a differentiating circuit including the capacitor 234 and the resistor 236, and a pair of isolating diodes 238 and 240, respectively. The diodes 238 and 240 permit only positive pulses to be applied to the bases of the transistors 230 and 232 so that the negative-going portion of the output waveform from the control channel flip-flop 106*c* does not affect the state of the flip-flop 226, but the positive-going portion of the output wave form from the control channel flip-flop 106*c* is applied to both the bases of the two transistors 230 and 232, to change the state of the flip-flop 226 irrespective of the previous state thereof. An output is taken from the collector of the transistor 232 of the flip-flop 226, and applied to the input of the flip-flop 228. The input circuit of the flip-flop 228 is identical to that of the flip-flop 226, which has been described above. The output terminal 242 (FIG. 4) of the flip-flop 106*b* of the clock pulse channel (*b*), is connected to the correspondingly numbered terminal of FIG. 6. The terminal 242 is connected through the diodes 244 and 246 (FIG. 6) to the base of the transistor 232 and to the base of the transistor 248 respectively. In all other respects, the flip-flops 226 and 228 are identical in structure to the flip-flop 106*b* illustrated in FIG. 4.

An AND gate including the diodes 262 and 264 is connected to an output from the collector of the transistor 232 of the flip-flop 226, and also to an output from the collector of the transistor 229 of the flip-flop 228. If the potential of either of the collectors connected respectively to the diodes 262 and 264 is negative with respect to ground, current flows from ground through the resistors 268 and 266 and through one or both of the diodes 262 and 264 to produce a relatively negative potential at the terminal 270, connected to the junction of the resistors 266 and 268. But if both inputs are near ground potential, no significant current flows and the potential at the terminal 270 is also near ground potential. The output terminal 270 is connected to the correspondingly numbered terminal of the trigger transistor in the EP modifier 118 illustrated in FIG. 5.

Referring now to FIG. 9, curves K, and M through O illustrate five of the possible program signals which may be recorded on the master tape 20 in the control track thereof, and sensed by the master tape head section 24*c*. Curve L may be recorded only on the copy tape, as will be described hereinafter. These signals are recognized by the program-controlled machine, and the machine is caused to execute, in response to such signals, certain functions such as clamping and unclamping jaws mounted on a movable arm, etc. The curves M, N, and O are made up of various binary combinations of pulses present during a cycle interval, as measured by a signal derived from the clock track of the program tape. Curve A illustrates the clock wave form which is recorded on the program tape, which wave form constitutes a square wave having positive and negative excursions of equal durations within each complete cycle interval of such wave form. The beginning of a cycle interval is indicated by a positive going wave front of this signal, occurring at times identified as $t_0$, $t_0'$, and $t_0''$ in FIG. 9. Thus, the curves M, N, and O are each distinct, and recognizable in relation to the clock signal of curve A. Curve M has only a single pulse per cycle, identified in FIG. 9 as an A pulse; curve N has only A and B pulses, and curve O has only A, B, and D pulses.

Each cycle interval is subdivided into twelve equal periods extending between the times identified in FIG. 9 *as* $t_1$, $t_2$, etc. The A pulse extends for one period, from $t_0$ to $t_1$; the B pulse from $t_3$ to $t_4$; the C pulse from $t_6$ to $t_7$; and the D pulse from $t_9$ to $t_{10}$. Each of the pulses is separated by two intervals. By use of this pulse coding system, program control signals may be recognized by the average amplitude of the signal. The average amplitude of the curve M, for example, is one-twelfth maximum; curve N is one-sixth maximum; and curve O is one-fourth maximum.

It will be noted that the wave form illustrated in curve K of FIG. 9 consists of all four A, B, C, and D pulses. This particular signal which has all of the A, B, C, and D pulses present is called an end-of-program or EP signal, and effects a tape-switching operation of the program-controlled machine as described above. The control signals which are illustrated in curves M through O do not indicate an end-of-program, but rather a particular function to be executed by the program controlled machine, the same program tape maintaining control of the machine.

Curve L is a wave form of a modified end-of-program or EP′ signal, having regular B and C pulses, and an elongated D pulse which overlaps the A pulse time of the succeeding cycle interval, which begins at time $t_0'$. It is the function of the circuit 118 of FIG. 6 to derive the EP′ signal as shown in curve L when an EP signal, as shown in CURVE K, is detected by the EP detector 116 of FIG. 5. The manner in which the modification is effected will now be described with reference to FIGS. 5 and 6 and to the curves A through L of FIG. 9.

When an EP pulse is being read from the control track of the master tape, all four code pulses A, B, C and D, are present. Thus, the wave form shown in curve B of FIG. 9 is applied to the base of the transistor 222 (FIG. 5) and the wave form shown in curve C is applied to the base of the transistor 224 (FIG. 5) of the shaper 104*c*. It will be remembered that these signals are shaped by the transistors 222 and 224 and applied to the control channel flip-flop 106*c*, such that the leading and trailing edges of each of the pulses read from the master tape causes successive changes in state of the flip-flop 106*c*. The wave forms of the two outputs of the flip-flop 106*c* are indicated respectively by curves D and E of FIG. 9.

The wave form E is applied, through the switch S4–E, to the input of the flip-flop 226 of the EP detector of FIG. 6, the output of which flip-flop is illustrated in curve F of FIG. 9. The positive going portions of the wave form E trigger the flip-flop 226 between its two stable to derive the wave form F.

The wave form F is applied to the input of the flip-flop 228 of FIG. 6, so that the positive going portions of the wave form F trigger the flip-flop 228 between its two stable states to produce an output wave form at the collector of the transistor 249, which wave form is illustrated in curve G of FIG. 9.

At the beginning of each cycle interval $t_0$, $t_0'$, etc., the flip-flops 226 and 228 are reset by the clock signal input to the terminal 242 of FIG. 6, which signal is illustrated in curve A of FIG. 9. Thus, at the beginning of each cycle interval, the output of the flip-flop 226, shown in curve F is relatively negative, and the output of the flip-flop 228, shown in curve G is relatively positive.

The two wave forms F and G are gated together by the AND gate including the diodes 266 and 264 to produce a wave form H at terminal 270, which wave form becomes relatively positive only when both of the input wave forms F and G are also relatively positive, as has been described. It is noted from the curves of FIG. 9 that the wave form shown in curve H becomes positive just after the trailing edge of the C pulse detected on the control track of the master tape.

The signal having the wave form shown in curve H is applied to the base of the trigger transistor 220 of the EP modifier 118 (FIG. 5) from the terminal 270, and drives the transistor 220 into conduction. The collector current flowing through the biasing resistors 271 and 273 of the transistor 222 is thus modified by the connection through switch S4–B and switch S3–B (FIG. 3*a*) to the collector of the transistor 220, thereby lowering the potential at the emitter of transistor 222 and biasing it off.

The wave form at the collector of the shaper transistor 222 is illustrated by curve I of FIG. 9, while that present at the collector of the other shaper transistor 224 is shown in curve J of FIG. 9. It is noted that the operation of the switching transistor 220 causes the shaper transistor 222 to become nonconductive just after the trailing edge of the C pulses, thereby deleting the D pulse, by holding the emitter of the transistor 222 at a relatively positive potential so that the negative-going differentiated trailing edge of the D pulse of the curve B, when applied to the base of the transistor 222, cannot make the transistor 222 conduct. The operation of the transistor 224, however, is not affected by the trigger transistor 220, and the D pulse is produced at the collector of the transistor 224, the positive-going leading edge of which changes the state of flip-flop 106*c* to begin an elongated D pulse which is shown in curves D and E. Since the D pulse is eliminated from the wave form I, however, the flip-flop 106*c* is not switched back to its other stable state until the trailing edge of the succeeding A pulse is present at the collector of the transistor 222. In the meantime, however, the occurrence of the positive-going portion of the wave form from the clock channel, illustrated in curve A, resets both of the flip-flops 226 and 228 of FIG. 6 to the initial starting condition. Since the flip-flop 228 already is in its initial condition at this time, only the flip-flop 226 is reset. This, however, terminates the positive pulse present on the line 270 shown in curve H of FIG. 10, thus permitting the shaper transistor 222 to become conductive at the trailing edge of the succeeding pulse (which is an A pulse) to change the state of flip-flop 106*c*. The condition of the circuit is then the same as after the original A pulse. This operation is continued to provide the wave forms D and E at the outputs of the flip-flop 106*c*, in which the D pulse is extended to overlap with the succeeding A pulse, to produce the EP′ signal illustrated in curve L of FIG. 10.

In connection with the operation of the circuit just described, it should be noted that the positive pulse on the wave form H begins just after the trailing edge of the third pulse which is detected on the control track of the master tape within a single cycle interval. If a fourth pulse is also detected during the same cycle interval, this fourth pulse is extended to overlap with the first pulse of the succeeding cycle by the operation described above. As noted above, four pulses occur within a single cycle interval only to signify the EP signal, so that the EP signal can always be detected by the EP detector without ambiguity.

Referring again to FIG. 2, the EP′ signal produced by the flip-flop 106*c* is recorded on the control track of the copy tape via the driver amplifier 108*c* and the copy tape head section 25*c*.

When the extended D pulse of the EP′ signal is produced by the flip-flop 106*c*, the signals shown in the D and E curves of FIG. 9 are connected via terminals 272 and 274 to the EP′ signal detector 120 illustrated in FIG. 7. The wave form D is connected through a resistor 276 and a diode 278 to the base of a transistor 280. The emitter of the transistor 280 is connected through a resistor 282 to receive the wave form E from the control channel flip-flop 106*c*. The collector of the transistor 280 is connected directly to ground, and the base of the transistor 280 is connected to ground through the resistor 284 and capacitor 286 in parallel. A capacitor 288 is connected between the emitter of the transistor 280 ground. The resistor 282 and the capacitor 288 form an integrator circuit, the output of which is connected to the emitter of the transistor 280. The resistor 276 and capacitor 286 form a second integrator circuit, the output of which is connected to the base of the transistor 280.

It will be understood from inspection of curve D in

FIG. 9, that the total duration, during each cycle interval, that the EP′ signal is at its lower potential is equal of the total time that the EP′ signal is at its upper potential. In other words, the average value of the EP′ signal is exactly one-half maximum, or half way between the upper and lower potentials illustrated in curve D. This is the potential which appears at the emitter of the transistor 280, after a number of cycles of the EP′ signal have been applied to the integrator including the resistor 282 and the capacitor 288. A number of cycles are necessary, for the values of the resistor 282 and the capacitor 288 are chosen to give a relatively long time constant.

An identical, but inverted signal, shown in curve E of FIG. 9, is applied to the input of the other integrator including the resistor 276 and the capacitor 286, but the output of this integrator is not the average value f the applied signal. This is because of the resistor 284, which is in parallel with the capacitor 286, and because of the series connected diode 278. The resistor 276 is smaller than the resistor 284, to provide a lower time constant for charging the capacitor 286 (in the direction in which the base of the transistor 280 is driven negative) then for discharging the capacitor 286 through the resistor 284.

When a potential which is more negative than the base of the transistor 280 is applied to the terminal 274, current flows from the capacitor 286 through the diode 278 and the resistor 276. When the input potential is higher than the base potential of transistor 280, however, the capacitor 286 discharges through the resistor 284. Since the resistor 284 is larger than the resistor 276, the EP′ signal which is applied to the second integrator circuit via the terminal 274, produces a potential at the output of the integrator which is more negative than the average value of the EP′ signal. Therefore, the transistor 280 remains cut off when an EP′ signal is applied to the two inputs 272 and 274.

If the input signal applied to the first integrator by way of terminal 24 has a more negative average value, as, for example, curve M of FIG. 9, the emitter of the transistor 280 would ordinarily by lowered still further. When such a signal is present, however, the signal applied to the terminal 274 produces a potential at the base of the transistor 280 which is more positive than that obtaining during an EP′ signal. The transistor 280, therefore, has a higher base potential than emitter potential, and accordingly is driven into conduction, thereby preventing the potential of the emitter from being lowered further than that of the base. Indeed, in the extreme case, when the potential applied to the terminal 272 is a D.C. voltage at the potential of −12 volts, and the signal applied to the terminal 274 is a D.C. voltage at substantially ground potential, the emitter follower action of the transistor 280 maintains the potential of the emitter very close to the upper potential, or ground. This is an erroneous signal condition, since no legitimate program signal is at the upper potential for more than one-half of a cycle interval (see FIG. 9, curves K through O), and is therefore ignored by the transcriber control unit, as will be more fully described hereinafter.

The values of the resistors 276, 282 and 284, and the capacitors 286 and 288 are chosen so that the circuit including the transistor 280 produces an output voltage at its emitter which is most negative when the EP′ signal is applied to the terminals 272 and 274 from the flip-flop 106*c*, and more positive for any other signal which has an average value more or less than the average value of the EP′ signal.

It will be remembered that of the normal, unmodified control signals which may be recorded on the control track of the master tape, only the EP signal includes all four of the A, B, C, and D pulses. It will thus be apparent that when the EP signal is being read from the master tape, and manifested by the flip-flop 106*c*, although the potential at the emitter of the transistor 280 is less negative than for the EP′ signal, it is nevertheless more negative than for any of the other control signals illustrated in curves M, N, and O of FIG. 9.

The emitter of the transistor 280 is connected to the input of a multivibrator including the normally nonconducting transistor 290 and the normally conducting transistor 292.

The monostable multivibrator including the transistors 290 and 292 has components which are selected to cause the normally nonconducting transistor 290 to be driven into conduction only when an EP signal or an EP′ signal is being detected. Thus, for all other signals applied to the terminals 272 and 274, the monostable multivibrator including the transistors 290 and 292 remains in its normal state.

The transistor 292 is normally biased to be conductive by an emitter-base current flowing from +12 volts through the resistor 294 to the emitter of the transistor 292 and from the base of the transistor 292 through the diode 296 and resistor 298 to the tap of the voltage divider including resistors 300 and 302 connected between ground and −12 volts. The collector current of the transistor 292 flows through a resistor 304 to a potential of −24 volts.

When the negative potential is applied to the base of the transistor 290, during the detection of an EP or EP′ signal, the transistor 290 conducts through the resistor 294 and through a resistor 306 connected between its collector and the −24 volt source, thereby raising the potential at the collector of the transistor 290. The rising collector potential of the transistor 290 is connected to the base of the transistor 292 through the diode 296 via the series connected capacitor 308 and resistor 310. A capacitor 312, connected between the base of the transistor 292 and ground, however, prevents the base potential of the transistor 292 from rising rapidly. After a time, dependent on the time constant of the circuit including the capacitor 312, the diode 296 becomes back-biased, cutting off the transistor 292. The capacitor 308 is much larger than the capacitor 312, so the transistor 292 remains cut off until after a time dependent on the time constant of the circuit including the capacitor 308.

At the end of this time, the transistor 292 again becomes conductive and produces a positive pulse at its collector, which pulse is differentiated by a circuit including a capacitor 314 and a resistor 315, the output of which is connected to the input of a further monostable multivibrator including the normally conducting transistor 316 and the normally nonconducting transistor 318. The transistor 316 is biased for conduction by connection of its emitter to ground and its base through a resistor 320 and a calibration network including a pair of potentiometers 322 and 324 to −24 volts. Collector current normally flows from the collector of the transistor 316 through a resistor 334 to −24 volts. The differentiated output pulses from the multivibrator including transistors 290 and 292 are connected through the diode 328 to the base of the transistor 316, and a positive pulse operates to cut off the transistor 316. Negative pulses have no effect, as they are blocked by the diode 328.

When the transistor 316 becomes cut off, its collector potential falls. The falling collector potential is connected through the feedback circuit including capacitor 332 and resistor 330 to the base of the transistor 318, thereby driving it into conduction. The base of the transistor 318 is connected by a resistor 342 to +12 volts. During the time the transistor 318 is conducting, a positive pulse is applied to the terminal 346 through the diode 319. As the transistor 318 becomes conductive, the potential at its collector rises, which rising potential is connected to the base of the transistor through the diode 338 and the capacitor 344, thereby maintaining transistor 316 cut off, for a time determined by the time constant of the circuit including the capacitor 344, the resistor 320, and the calibration network including the potentiometers 322 and 324. The resistance introduced into the circuit by the potentiometers 322 and 324 may be varied to cause the appropriate delay in the output.

At the end of this time, the transistor 316 again becomes conductive, thereby cutting off the transistor 318 and terminating the positive pulse at the output terminal 346.

The output terminal 346 is connected to the control circuit to cause the forward progress of the master and copy tapes to be stopped and reversed at the initiation of the positive pulse presented to the terminal 346, the reversal of the copy tape to end at the end of the positive pulse of terminal 346.

The time delay of the multivibrator including the transistors 290 and 292 is provided so that the EP' signal may be recorded on the copy tape for a number of cycles extending for about two seconds. The two second interval is provided to insure that the program-controlled machine with which the copy tape is to be used, will be able to arrive at its starting point prior to the initiation of the next program cycle, and to perform any desired equipment checks at the end of the program. The delay introduced by the multivibrator including transistors 316 and 318 is for determining the amount of rewinding of the copy tape prior to initiating a subsequent recording cycle.

After the master and copy tapes have been stopped, they are reversed and partially rewound by a mechanism to be described hereinafter. The output signal from the terminal 246 persists for a predetermined time, as described, which permits the copy tape to be partially rewound, and then stopped. The rewinding of the master tape, however, is completed until the master tape sensor 30 (FIG. 2) indicates the complete rewinding of the master tape, whereupon the control unit stops the master tape and starts the copy tape in forward direction again. The forward progress of the copy tape is continued until the auxiliary copy tape head 82 (FIG. 2) is opposite that portion of the copy tape upon which the EP' signal has been recorded. The EP' signal is then amplified by the amplifier 102*d* (FIG. 2) shaped by a shaper circuit 104*d*, and manifested by flip-flop 106*d*. The EP' signal is then detected by the EP' detector 124, which will now be described.

The EP' signal detector associated with the restart channel (*d*) is illustrated in FIG. 8. The terminals 348 and 350 are connected to the output of the flip-flop 106*d*, which furnishes signals similar to those illustrated in curves D and E of FIG. 9 when the EP' is being read by the head 82 from the copy tape. The D wave form is applied to terminal 350 while the E wave form is applied to terminal 348. The terminals 348 and 350 are connected to a transistor 352 in the identical manner described in connection with the transistor 280 of FIG. 7. The EP' signal, when detected, produces a negative potential at the emitter of the transistor 352, which is connected to the input of a monostable multivibrator including a normally nonconducting transistor 354 and a normally conducting transistor 356. The monostable multivibrator including the transistors 354 and 356 is biased to be responsive only to the most negative potential produced at the emitter of the transistor 352, which occurs when an EP' signal is being read from the copy tape. All other signals produce more positive voltages at the emitter of the transistor 352, which are ignored.

The transistor 356 is normally biased into conduction by an emitter-base current flowing from the +12 volt source through a resistor 358 to the emitter of the transistor 356, and from the base of the transistor 356 through a resistor 358 to a source of —12 volts. The collector current of the transistor 356 flows through the resistor 360 to a source of —24 volts.

When the negative potential is produced at the emitter of the EP' detector transistor 352, the transistor 354 is rendered conductive, and a collector current flows through a resistor 362 to the —24 volt source. The capacitors 364 and 366 are connected in series from the collector of the transistor 354 to ground, and prevent the potential of the collector of the transistor 354 from rising immediately. The collector potential, however, does rise slowly and causes the base of the transistor 356, which is connected to the junction of the capacitors 364 and 366 to eventually rise to the point where the transistor 356 is cut off. The transistor 256 remains cut off until the capacitor 364, which is larger than the capacitor 366, becomes discharged, whereupon the transistor 356 again becomes conductive.

When the transistor 356 is cut off, a negative pulse is produced at its collector, which is amplified by a transistor 368, connected in common base arrangement.

The transistor 368 is normally biased to be slightly conducting by a base-emitter current flowing from the —12 volt source to the base of the transistor 368 and from the emitter of the transistor 368 through the resistor 360 to the —24 volt source. The collector current flows from the +12 volt source through a resistor 370. The transistor 368 thus operates as a class A amplifier.

The negative pulse, amplified by the transistor 368, appears at its collector which causes a common-emitter transistor 372 to become conductive. The transistor 372 then conducts a current from ground to a terminal 374 which is connected to the control units to restart forward progress of the master tape. A further transcription of the program is then recorded on the copy tape in the manner which has already been described.

Referring now to FIGS. 3*a* and 3*b* which together form a schematic circuit diagram of the control circuit for the transcriber, it will be seen that in FIG. 3*b* a master power switch S1 applies line voltage to a pilot lamp 378 and a power supply 380. The power supply furnishes voltages of +12 volts, —12 volts, and —24 volts, which are required for the operation of the circuits of the transcriber.

The operation of the power supply 380 of FIG. 3*b* provides the required voltages to operate the control circuits of FIG. 3*a*. The transistor T1 conducts immediately if the master tape sensor 30 is adjacent an opaque portion of the master tape. In this event, emitter-base current flows from ground to the emitter of the transistor T1 and from the base through resistors 384 and 386 serially connected to the —12 volt source. Collector current flows from the collector of the transistor T1 through a relay coil H to the —24 volt source. The master tape sensor 30 corresponds to the photocell of FIG. 2, which has a low impedance when exposed to light, and a high impedance when it is not exposed to light. The master tape sensor 30 is connected between the +12 volt source and the junction of the resistors 384 and 386, such that the potential of the base of transistor T1 is negative when the master tape sensor 30 is adjacent an opaque portion of the master tape, while when the master tape sensor 30 is adacent the transparent leader present at the end of the master tape, its impedance is low and the transistor T1 is cut off.

A second transistor T2 is connected in the same way with respect to a copy tape sensor 31, a base resistor 390, and a resistor 392 connected to the —12 volt source. Hence, the transistor T2 is also immediately conductive if the copy tape sensor is adjacent an opaque portion of the copy tape. The collector current from the transistor T2 causes the relay D to operate through contacts B1 and G4 which are closed at this time. When the relay H is operated, the contact H2 closes completing the circuit from ground through the closed contacts G3 and A1 to operate the relay C.

Of the several relays illustrated in FIG. 3*b*, each has a distinct function. The A relay is always energized when the master tape is to be moved forward, and the B relay is energized when the copy tape is to be moved forward. Similarly, the C and D relays are associated with reverse movement or rewinding of the master and copy tapes respectively. The E and F relays are actuated at the end of each transcription cycle in response to an EP′ pulse being recorded on the copy tape. As will be later described, the E relay causes a further cycle of operation in which the program is recorded again on the succeeding portion of the copy tape, while the F relay is energized only after the last cycle has been completed. The G relay, when energized, indicates that a cycle of operation is not complete, and the H relay is operated in response to the position of the master tape, as indicated by the master tape sensor 30.

The C and D relays, which are actuated when the power switch S1 is closed (providing that the two sensors 30 and 31 indicate that the tapes are not completely rewound), cause rewinding of the master and copy tapes. As shown in FIG. 3*b*, the master tape is caused to be rewound by closing contact C3 and opening contact C4, which provides increased current flow to the master supply motor 394, by short circuiting resistor 420, and reduced unidirectional current flow to the master take up motor 396, by placing the resistor 422 and a diode 424 in series therewith for optimum rewind speed. Similarly, contact D1 closes and D2 opens, providing increased current to the copy supply motor 398, by shorting the resistor 426, and reduced unidirectional current to the copy take up motor 400, by placing a diode 438 and a resistor 430 in series therewith also for optimum rewind characteristics. The master and copy brake solenoids 98 and 90, respectively, are actuated by a closing of the contacts C5 and D3, respectively, to cause the yoke 84 (FIG. 1) to be drawn away from the brake drums of the supply and take up reels of both master and copy tapes. In addition, the air solenoid 402 is actuated to connect the source of pressurized air to the nozzles 77 and 81 (FIG. 2) to blow jets of air between the master and copy tapes and their respective heads 24 and 25. A capstan motor 404 rotates the capstan 26 continuously, but has no function during the rewinding of the master and copy tapes.

Continuing the description of the operating sequence, once the master and copy tapes are both completely rewound so that the master and copy sensors 30 and 31 both have a low impedance, the associated transistors T1 and T2 are cut off. The cut off of transistor T2 deenergizes the relay D, while the cut off of the transistor T1 deenergizes the relay H which in turn, through its contact H2, deenergizes the relay C.

Both of the tapes, having been rewound, are stopped by deactuation of the master and copy brake solenoids 98 and 90 (FIG. 3*b*), by the opening of contacts C5 and D3. The contacts C3 and D1 open limiting the braking current to master supply motor 394 and copy supply motor 398, and the contacts C4 and D2 close, to condition the master and copy take up motors 396 and 400 for full energization in forward operation, but all four of the reels are held stationary by the brakes. Contacts C6 and D4 also open, disengaging the air solenoid 402.

After the rewinding of the master and copy tapes, the manual starting switch S2 is closed. The lower section of the starting switch S2–B completes a circuit through the relay G through closed contact F1, and the contact G1 closes thereby holding the relay G in operation after the starting switch S2 is released. The upper section of the start switch S2–A completes a current path from ground through the A relay and in parallel through the diode 406 and the B relay, and through closed contacts F2, G2, and E1 to the —24 volt source. The A and B relays thereupon close. Contact A5 closes, energizing the master brake solenoid 98 to release the master brake from the master take up and supply reels, and contact A4 closes, causing the master pinch roller solenoid 58 to pinch the master tape against the capstan 26 (FIG. 2). The master tape, therefore, moves in a forward direction at a speed controlled by the capstan 26. At the same time the contacts B3 and B4 close, energizing the copy pinch roller solenoid 59 and the copy brake solenoid 90 to cause release of the brake shoes from the copy tape reels, and pinching of the copy tape against the capstan 26. The contact A2 also closes, but the diode 416 prevents the energization of the D relay.

The copy tape, therefore, is caused to move in a forward direction at the same speed as the master tape as governed by the common capstan 26. Almost simultaneously after the initiation of the forward movement of the master and copy tapes, the master and copy tape sensors 30 and 31 go on to the opaque portion of the tape and cause the transistors T1 and T2 to again become conductive. The collector current from the transistor T1 operates the relay H, which opens its contact H1, but current flows from the collector of the transistor T2 through the diode 416 and the closed contact A2 to the A and B relays, and then to the —24 volt source. The relays A and B are, therefore, held on as long as the recording is being made on the opaque portion of the copy tape by the current through transistor T2 and contact A2. The H relay also closes the contact H3, which, with the contact A3, connects the driver amplifier 108 of each of the transcription channels to —24 volts. In FIG. 4, —24 volts is thus connected to the terminal 214 enabling the operation of the copy tape head **25*b* by the transistors 202 and 204**. It will be noted that the collector current of the transistor T2 does not cause operation of the D relay because of the now open contacts B1 and G4. Similarly, the C relay cannot be operated when the H relay closes because of the now open contacts A1 and G3.

Thus the A and B relays are held on, to control the forward motion of both of the tapes until an EP′ signal is detected by the circuit of FIG. 7. It should be noted that the EP′ detector circuit 120 of FIG. 7 is disabled during rewinding of the master tape by the contact C2 (FIG. 3a) connected to terminal 375 of FIG. 7, by which the emitter of the transistor 280 is held at ground potential during the rewinding of the master tape. The output terminal 346 of FIG. 7 is connected to the similarly numbered terminal of FIG. 3*a* and causes actuation of the E relay after an EP′ signal has been detected by the transistor 280 and delayed a predetermined interval by the multivibrator including transistors 290 and 292. It will be remembered that after this delay, the output transistor 318 becomes conductive and causes a current to flow from ground through the transistor 318 to the terminal 346. Current flows from the terminal 346 through the E relay to the —24 volt source. The diode 412 prevents the operation of the E relay by negative pulses which may be present at the terminal 346. The switch S3 also forms a part of the path for the energization of the E relay, and this switch is normally in the condition shown, to enable operation of the E relay.

When the E relay operates, contact E1 opens, which deactuates the A and B relays. The contacts A5 and B4 (FIG. 3*b*), therefore, open to deenergize the master and copy brake solenoids 98 and 90, to brake the four reels of the transcriber to a stop, and the contacts A4 and B3 open to disengage the master and copy pinch rollers. A contact A1 closes a short time after the contact A5 opens, permitting the actuation of the C relay through the closed contact E2. The C relay then closes its contact C1 to hold it through the closed contact H2 even after the E relay has been deenergized. Similarly, the contact B1 closes a short time after the contact B4 opens to energize the D relay by the collector current of the transistor T2 flowing through the closed contact E3. The energization of the C and D relays closes contacts C5 and D3 (FIG. 3*b*), releasing the brake from the four tape reels of the transcriber. Contacts C6 and D4 close to cause the air solenoid 402 to be energized. Also, the contacts C3 and D1 close to connect full power to the master and copy supply motors 394 and 398, and the contacts C4 and D2 open to reduce the power supply to the master and copy take up motors 396 and 400 as already described. Both the master and copy tape then rewind under the control of the energized C and D relays.

At the conclusion of the time interval introduced by the monostable multivibrator including the transistors 316 and 318 (FIG. 7), the E relay is deenergized and opens its contact E3, thus deenergizing the D relay. The contact D3 thereupon opens to cause braking of the master and supply reels of the copy tape. Simultaneously, the contact D1 is opened and the contact D2 closed to condition the copy supply and take up motors 398 and 400 for forward movement of the copy tape. However, such forward movement is prevented by the deenergization of the copy brake solenoid 90. The contact D4 also opens, but C6 remains closed and maintains the energization of the air solenoid 402.

The contact E1 also closes, but prevents operation of the A and B relays at this time because of the open contacts H1 and A2. The contact E2 also opens, but does not deenergize the C relay because the C relay is held in by the closed contacts C1 and H2.

At this portion of the cycle, the master tape is still being rewound, and the copy tape, having been rewound for a short interval, is stopped. When the master tape is completely rewound, the master tape sensor 30 passes on to the transparent leader of the master tape and cuts off the transistor T1, deenergizing relay H. The contact H2 then opens and deenergizes the C relay. The contact C6 opens, deactuating the air solenoid 402. The contact C5 opens, causing the master brake solenoid 98 to be deenergized to permit braking of the master tape reels. The contact H1 also closes, permitting the collector current from the transistor T2 to pass through the diode 414 and the contact H1 to energize the B relay through the closed contacts F2, G2, and E1. The A relay is not energized at this time because of the blocking of the diode 406. The B relay opens and closes appropriate contacts of FIG. 3*b* to permit forward movement of the copy tape while the master tape remains stationary. This condition is continued until a signal is received from the EP′ detector 124 of FIG. 8.

It will be remembered that the transistor 372 of FIG. 8 becomes conductive a predetermined time after an EP′ signal has been detected by the auxiliary copy tape head 82 in the restart channel (*d*) of FIG. 2. Thus, when the EP′ signal is detected on the copy tape, collector current flows from transistor 372 (FIG. 8) through the terminal 374 to operate the A relay. Thereupon, the contact A2 closes, holding in the A relay, and the A contacts of FIG. 5*b* shift, permitting the master tape to be moved forward with the copy tape for the transcription of a succeeding program from the master tape to the copy tape.

It should be noted that the circuit of FIG. 8 is disabled during stopping and reverse movement of the copy tape, by the contact B2 (FIG. 3*a*) which is connected to terminal 373 of FIG. 8, and which holds the base of the transistor 352 at ground potential except during forward movement of the copy tape.

This entire sequence of operations, beginning with the signal from the EP′ detector 120 of FIG. 7 applied at terminal 346 to actuate the E relay, may be repeated as many times as is desired, within the limits of the length of the copy tape. When the operator determines, however, that a sufficient number of programs have been transcribed onto the copy tape, the switch S3 in FIG. 3*a* is moved to its other position.

It will be remembered that switch S3–B is connected between the two terminals 225 and 227 of FIG. 5 and permits the signal developed at the collector of the switching transistor 220 to be applied to the shaper transistor 222 to inhibit the D pulse from being applied to the control channel flip-flop 106*c*. When the switch S3–B is moved to its other position, however, the switching transistor 220 is disconnected from the shaper 222, and the shaper circuit then controls the flip-flop 106*c* to record on the copy tape the same signal being read from the master tape, namely, the EP signal.

The EP signal is detected by the EP′ detector of FIG. 7, which furnishes a signal to the terminal 346 (FIG. 3*b*) and causes energization of the F relay, which is connected in circuit by the switch S3–A, instead of the E relay which is actuated in continuous operation. The operation of the F relay opens contact F1 which deactuates the G relay, and also opens contact F2 which deactuates the A and B relays. The deactuation of the A and B relays brake both of the tapes to a stop by the circuitry of FIG. 3*b*.

The deactuation of the G relay closes the contact G3 which completes a circuit through the C relay through closed contact H2 and the contact A1 which closes when the A relay is deenergized. Therefore, the master tape is caused to move in its reverse direction. Also the contact G4 closes and completes a circuit through the D relay through the contact B1, which closes when the B relay is deactuated. Therefore, the copy tape also is rewound. During rewinding, the air solenoid 402 is also energized.

The rewinding of the master and copy tapes is continued until the master and copy tape sensors 30 and 31 move into the transparent leader portions of both tapes, cutting off transistors T1 and T2. When the transistor T1 is cut off, the relay H is deactuated, opening contact H2 and deactuating the C relay. Similarly, when the transistor T2 is cut off, current cannot flow through the D relay, and so it is also deactuated. No further operation of the transcriber can occur until the switch S2 is again closed long enough to carry the transparent leader past the copy tape sensor 31, which, of course, will not occur until a fresh copy tape is inserted into the transcriber, so that another copy tape having a plurality of sequential programs similar to a program on a master tape, can be transcribed.

The relays A, B, C, D and H are provided with shunting diodes 408, so that each of the these relays can be actuated only by a current flowing in one direction. Thus transients which may occur in the opposite direction will not cause faulty operation of the relays. Similarly, the connection of the driver amplifiers by way of the contacts A3 and H3 is clamped to the +12 volt source by a diode 410, so that in no event can the potential applied to the driver amplifiers exceed this potential.

It should be noted that in the description of the control unit illustrated in FIG. 8, it was indicated that the normal position of the switch S3 is as shown. However, if the transcriber is used to transcribe a relatively long program sequence, such that only one program sequence can be placed on a copy tape, of course the switch S3 is placed in its other position, whereupon only a single cycle of operation of the transcriber is permitted, both of the tapes being rewound completely and halted at the occurrence of the first EP signal, which is recorded on the copy tape in unmodified form.

In FIGS. 4, 5, 7 and 8, the switches S4–A through S4–E are shown in their normal positions, where they remain as long as the master tape has its clock and control signals recorded in normal polarity. When the signals on the clock track of the master tape are inverted, however, the switch S4–A is moved to its other position, to permit proper operation of the EP detector of FIG. 6. Similarly, when the control signals are inverted, the switches S4–B through S4–E are moved to permit proper operation of the EP′ detectors of FIGS. 7 and 8, the EP detector of FIG. 6, and the EP modifier of FIG. 5. When both the control and clock pulses are inverted, all of the switches S4–A through S4–E are moved. This allows for complete flexibility of transcription of control tapes intended for use on different program-controlled machines. In each case, the copy tape is transcribed with pulses of the same polarity as were recorded on the master tape.

Without further elaboration, the foregoing will so fully explain the character of our invention that others may, by applying current knowledge, readily adapt the same for use under varying conditions of service while retaining certain features which may be properly said to constitute the essential items of novelty involved, which items are intended to be defined and secured to us by the following claims.

We claim:

1. In a transcriber for transcribing information signals magnetically recorded on a master tape to a copy tape, the combination comprising a supply reel and a take-up reel for said master tape, a supply reel and a take-up reel for said copy tape, a continuously rotating capstan, a pinch roller for said master tape, a pinch roller for said copy tape, control means for selectively causing said pinch rollers to independently pinch their respective tapes between the nip of said respective pinch rollers and said capstan, drive means for each of said supply reels, and means responsive to said control means for controlling said supply reel drive means for selectively causing said master and copy tapes to be rewound upon said supply reels when said pinch rollers are disengaged from their respective tapes.

2. Apparatus according to claim including a master tape transducing head disposed adjacent to the path of said master tape, a copy tape transducing head disposed adjacent to the path of said copy tape, and means for selectively directing a jet of air between each of said heads and its respective tape.

3. Apparatus for transcribing signals magnetically recorded on a master tape to corresponding signals magnetically recorded on a copy tape, comprising a master tape transducing head, a master tape transport mechanism for causing said master tape to move past said master tape head, a copy tape transducing head, a copy tape transport mechanism for causing said copy tape to move past such copy tape head, means for causing said master and copy transport mechanisms to reverse the direction of movement of their respective tapes in response to a predetermined signal detected by said master tape head, and means responsive to said predetermined signal for stopping the reverse movement of said copy tape before stopping the reverse movement of said master tape.

4. Apparatus according to claim 3, including means for causing said copy tape transport mechanism to restart forward movement of said copy tape past said copy tape head in response to the reverse movement of said master tape bringing said master tape to a predetermined position.

5. Apparatus according to claim 4, including an auxiliary copy tape head disposed adjacent to said copy tape, detector means connected to said auxiliary copy head and responsive to a predetermined signal, and means to cause said master tape transport mechanism to restart forward movement of said master tape past said master tape head in response to a predetermined signal detected by detector means after forward movement of said copy tape has been restarted.

6. Apparatus according to claim 4, wherein said means for causing said copy tape transport mechanism to restart forward movement of said copy tape includes a photosensitive mechanism for sensing a transparent portion of said master tape, said transparent portion being adjacent to said photosensitive mechanism when said master tape attains said predetermined position.

7. Apparatus according to claim 3, wherein said predetermined signal is a signal recorded on said master tape following the position of a recording of a complete sequence of signals constituting a program for a program-controlled machine, said predetermined signal being indicative of the end of said program sequence recorded on said master tape.

8. Apparatus according to claim 7 including modifying means for modifying said predetermined signal, said copy tape transducing head being responsive to said modifying means to record said modified signal on said copy tape in place of said predetermined signal.

9. Apparatus according to claim 8 including selectively operable switch means for disabling said modifying means when said switch means is in a selected position.

10. A transcriber for transcribing a plurality of tracks of information signals from a master magnetic tape to a copy magnetic tape, comprising a master transducing head associated with said master tape, a copy transducing head associated with said copy tape, transport means for moving said master tape in one direction past said master transducing head and for moving said copy tape in one direction past said copy transducing head, said master transducing head being operable to produce electrical signals corresponding to information signals recorded on said master tape, means connected to said master transducing head for receiving said signals and connected to said copy transducing head to permit said copy transducing head to record said signals on said copy tape, detector means connected to said master tape transducing head for producing an output signal in response to the occurrence of a predetermined signal at said master transducing head, delay means connected to said detector means for receiving and delaying said output signal, for a predetermined time, and means responsive to said delayed output signal to cause said transport means to stop the movement of said master and copy tapes.

11. Apparatus according to claim 10 including means selectively responsive to said delayed output signal to cause transport means to fully rewind said master and copy tapes and to inhibit further operation of said transport means.

12. A transcriber for transcribing a plurality of tracks of information signals from a master magnetic tape to a copy magnetic tape, comprising a master transducing head associated with said master tape, a copy transducing head associated with said copy tape, transport means for moving said master tape in one direction past said master transducing head and for moving said copy tape in one direction past said copy transducing head, said transport means having a single capstan adjacent each of said master and copy tapes, a first roller selectively operable to press said master tape against said capstan when said master tape is to be moved forward, and a second roller selectively operable to press said copy tape against said capstan when said copy tape is to be moved forward, said master transducing head being operable to produce electrical signals corresponding to information signals recorded on said master tape, means connected to said master transducing head for receiving said signals and connected to said copy transducing head to permit said copy transducing head to record said signals on said copy tape, detector means connected to said master tape transducing head for producing an output signal in response to the occurrence of a predetermined signal at said master transducing head, delay means connected to said detector means for receiving and delaying said output signal, for a predetermined time, and means responsive to said delayed output signal to cause said transport means to stop the movement of said master and copy tapes.

13. Apparatus according to claim 12, including means responsive to said halt signal to cause said transport means to move said copy tape in said one direction, an auxiliary transducing head associated with said copy tape and responsive to the occurrence of said predetermined signal on said copy tape to produce a restart signal, and delay means connected to said auxiliary transducer to delay said restart signal, said transport means being responsive to said delayed restart signal to move said master tape in its said one direction.

14. Apparatus according to claim 10 wherein said detector means comprises first and second input terminals, means for applying said signals to said first input terminal, means for inverting said signals and for applying the inverted signals to said second terminal, a first integrator circuit connected to said first input terminal for receiving said signals and for manifesting the average potential of said signals, a second integrator circuit connected to said second of said input terminals for receiving said inverted signals, and means for causing the output of said first integrator circuit to manifest a potential which may be no greater in one polarity sense than the output of said second integrator circuit, whereby the output of said second integrator circuit produces a potential having its greatest value in said one polarity sense for signals applied to said input terminals having a predetermined average value, and for manifesting a different potential for all other signals applied to said input terminals.

15. Apparatus according to claim 8 wherein said modifying means comprises shaper means responsive to signals detected from said master tape for shaping said signals and for providing first and second outputs of said shaped signals, bistable means responsive to said first and second outputs from said shaper means for switching to one of its states in response to a signal of one polarity from said first output and for switching to its other state in response to a signal of said one polarity from said second output for manifesting said signals, detector means connected to said bistable means for detecting the occurrence of said predetermined signal, and switch means connected in circuit with said shaper means, said switch means being responsive to said detector means for temporarily disabling said shaper circuit, said shaper circuit, when disabled being operative to omit a signal of said one polarity from said output, whereby the signal manifested by said bistable means is a modification of said predetermined signal.

16. Apparatus according to claim 5 wherein said predetermined signal comprises a predetermined number $(n)$ of pulses within a predetermined time interval, and said detector means comprises clock means for indicating the beginning of said interval, first and second bistable devices, means responsive to said clock means for placing each of said first and second bistable devices in a predetermined one of said stable states at the beginning of said interval, each of said first and second bistable devices being responsive to the pulses of said predetermined signal for switching to its second stable state in response to the $(n-1)$th pulse of said predetermined signal, gate means connected to said first and second bistable devices for producing an output indicating the occurrence of the $(n-1)$th pulse of said predetermined signal, and means responsive to the output of said gate means and the presence of the $n$th pulse of said predetermined signal for extending said $n$th pulse to overlap with the first pulse occurring during the next successive time interval.

References Cited by the Examiner

UNITED STATES PATENTS

| | | | |
|---|---|---|---|
| 2,560,234 | 7/1951 | Masterson | 179—100.2 |
| 2,856,464 | 10/1958 | Groom | 340—174.1 |
| 2,976,372 | 3/1961 | Sampson | 179—100.2 |
| 3,037,090 | 5/1962 | Bouzemburg | 179—100.2 |

JAMES W. MOFFITT, *Acting Primary Examiner.*

V. P. CANNEY, *Assistant Examiner.*